(12) United States Patent
Chou

(10) Patent No.: US 10,520,659 B1
(45) Date of Patent: Dec. 31, 2019

(54) LIGHT-EMITTING PAD STRUCTURE AND MANUFACTURING METHOD THEREOF

(71) Applicant: Hades-Gaming Corporation, New Taipei (TW)

(72) Inventor: Hung-Jen Chou, New Taipei (TW)

(73) Assignee: HADES-GAMING CORPORATION, New Taipei (TW)

( * ) Notice: Subject to any disclaimer, the term of this patent is extended or adjusted under 35 U.S.C. 154(b) by 0 days.

(21) Appl. No.: 16/280,035

(22) Filed: Feb. 20, 2019

(30) Foreign Application Priority Data

Dec. 19, 2018 (TW) .............................. 107146005 A

(51) Int. Cl.
*F21V 8/00* (2006.01)
*G06F 3/039* (2013.01)
*D05B 1/20* (2006.01)

(52) U.S. Cl.
CPC ........... *G02B 6/001* (2013.01); *G06F 3/0395* (2013.01); *D05B 1/20* (2013.01)

(58) Field of Classification Search
CPC ......... G06F 3/0395; G02B 6/001; G02B 6/00; G02B 6/0088; G02B 6/0065; D05B 1/20; G02F 1/133615
See application file for complete search history.

(56) References Cited

U.S. PATENT DOCUMENTS

| | | | | |
|---|---|---|---|---|
| 5,639,156 A | * | 6/1997 | Broxson | B42D 3/123 362/156 |
| 6,635,336 B1 | * | 10/2003 | Chen | G06F 3/0395 248/346.01 |
| 7,175,310 B1 | * | 2/2007 | Cotterell | G06F 3/0395 362/253 |
| 2014/0268777 A1 | * | 9/2014 | Saydkhuzhin | F21V 21/14 362/249.04 |
| 2016/0076708 A1 | * | 3/2016 | Shirilla | F21S 2/005 362/235 |

FOREIGN PATENT DOCUMENTS

| | | | | |
|---|---|---|---|---|
| AU | 2017101611 A4 | * | 12/2017 | ......... F21V 33/0048 |
| DE | 19958416 A1 | * | 6/2001 | .......... G06F 3/0395 |
| DE | 20309731 U1 | * | 9/2003 | .......... G06F 3/0395 |
| DE | 102005002449 A1 | * | 7/2006 | ......... F21V 33/0048 |

* cited by examiner

*Primary Examiner* — Erin Kryukova
(74) *Attorney, Agent, or Firm* — Chun-Ming Shih; HDLS IPR Services

(57) ABSTRACT

A light-emitting pad structure and a manufacturing method thereof are provided. The light-emitting pad structure includes: a pad unit, including a main pad body and a light-emitting module, and the main pad body has a top wall, a bottom wall and a lateral annular wall; a light-guiding strip, bent for being surrounded at a periphery of the lateral annular wall and arranged corresponding to the light-emitting module; a light-pervious fabric member having a middle segment and an outer segment, the middle segment is adhered to the top wall, the outer segment is adhered to the bottom wall, so that the light-pervious fabric member is formed with an accommodation bag arranged to cross the lateral annular wall and enclose the light-guiding strip; and a bottom plate adhered to and covering the bottom wall and the outer segment.

10 Claims, 6 Drawing Sheets

LIGHT-EMITTING PAD STRUCTURE AND MANUFACTURING METHOD THEREOF

BACKGROUND OF THE INVENTION

Field of the Invention

The present invention relates to a pad structure, for example a mouse pad, especially to a light-emitting pad structure and a manufacturing method thereof.

Description of Related Art

A conventional light-emitting mouse pad mainly includes a pad unit, a light-guiding strip and a light-emitting unit, for example light-emitting diode; the light-guiding strip is sewed at an outer periphery of the pad unit with a general or overlock sewing means, then the light-emitting unit is disposed corresponding to the light-guiding strip, so that a light source can be guided out from a light-guiding plate, and a better visual effect can be provided to users.

However, the conventional light-emitting mouse pad has disadvantages as follows: 1. the general or overlock sewing means may cause situations such as sewing thread being broken, uneven tightness of sewing thread or the sewing thread being inclined, thus the finished product may be determined as not qualified to a certain standard, thereby lowering the yield yate; and 2. the light-guiding strip is sewed at the outer periphery of the pad unit with a general or overlock sewing means, thus the light-guiding strip is irreplaceable even when the light-guiding strip is broken, and a trend of being environmental friendly cannot be satisfied.

Accordingly, the applicant of the present invention has devoted himself for improving the mentioned disadvantages.

SUMMARY OF THE INVENTION

The present invention is to provide a light-emitting pad structure and a manufacturing method thereof, which can be utilized for replacing a convention method of sewing a light-guiding strip at an outer periphery of a pad unit with a general or overlock sewing means, thereby increasing the yield rate of manufacturing the light-emitting pad structure.

Accordingly, the present invention provides a light-emitting pad structure, which includes: a pad unit, including a main pad body and a light-emitting module disposed on the main pad body, wherein the main pad body has a top wall, a bottom wall and a lateral annular wall; a light-guiding strip, bent for being surrounded at a periphery of the lateral annular wall and arranged corresponding to the light-emitting module; a light-pervious fabric member, having a middle segment and an outer segment arrange at a periphery of the middle segment, wherein the middle segment is adhered to the top wall, the outer segment is adhered to the bottom wall, so that the light-pervious fabric member is formed with an accommodation bag arranged to cross a top side and a bottom side of the lateral annular wall and enclose the light-guiding strip; and a base plate, adhered to and covering the bottom wall and the outer segment.

Accordingly, the present invention provides a manufacturing method of light-emitting pad structure, which includes: a step a) providing a pad unit, the pad unit includes a main pad body and a light-emitting module disposed on the main pad body, and the main pad body has a top wall, a bottom wall and a lateral annular wall; a step b) providing a light-guiding strip, the light-guiding strip is bent for being surrounded at a periphery of the lateral annular wall and arranged corresponding to the light-emitting module; a step c) providing a light-pervious fabric member, the light-pervious fabric member has a middle segment and an outer segment arrange at a periphery of the middle segment, the middle segment is adhered to the top wall, the outer segment is adhered to the bottom wall, so that the light-pervious fabric member is formed with an accommodation bag arranged to cross a top side and a bottom side of the lateral annular wall and enclose the light-guiding strip; and a step d) providing a base plate, the base plate is adhered to the bottom wall and the outer segment, so that the base plate is able to cover the bottom wall and the outer segment.

Based on what has been disclosed above, the light-guiding strip is accommodated in the accommodation bag while being positioned at the periphery of the lateral annular wall via the accommodation bag, thus a conventional method of general or overlock sewing at an outer periphery of a pad member can be replaced, and situations of sewing thread being broken, uneven tightness of sewing thread or the sewing thread being inclined can be avoided, thereby increasing the yield rate of manufacturing the light-emitting pad structure.

Based on what has been disclosed above, there are one or a plurality of openings formed on the accommodation bag for allowing the light-guiding strip to be accommodated in or removed from the accommodation bag through the opening, so that a user can replace the light-guiding strip according to the quality of the light-guiding strip or his/her personal tastes.

DETAILED DESCRIPTION OF THE INVENTION

Figure 1:
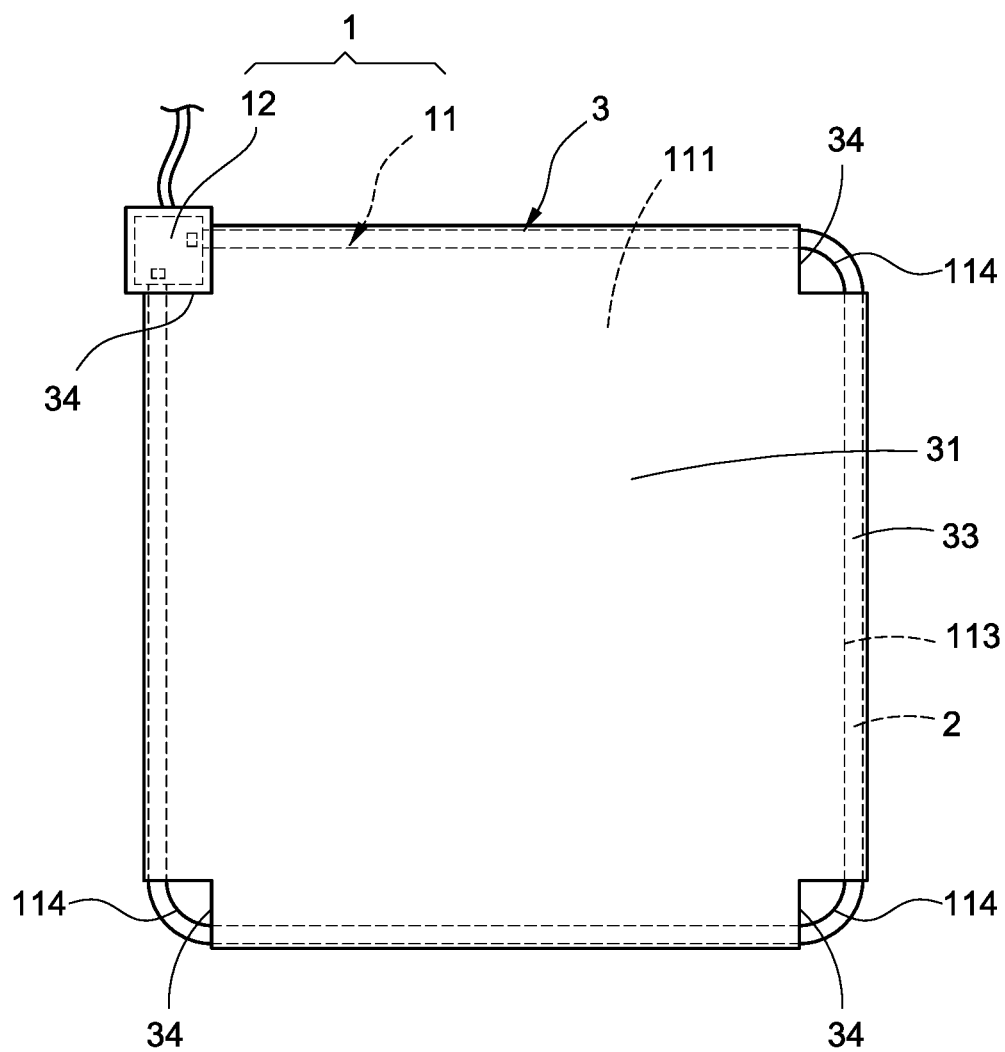
FIG. 1 is a schematic view showing the assembly of a light-emitting pad structure according to the present invention.

A preferred embodiment of the present invention will be described with reference to the drawings.

Please refer from FIG. 1 to FIG. 5, a light-emitting pad structure and a manufacturing method thereof are provided by the present invention. The light-emitting pad structure 10 mainly includes a pad unit 1, a light-guiding strip 2, a light-pervious fabric member 3 and a base plate 4.

Figure 2:
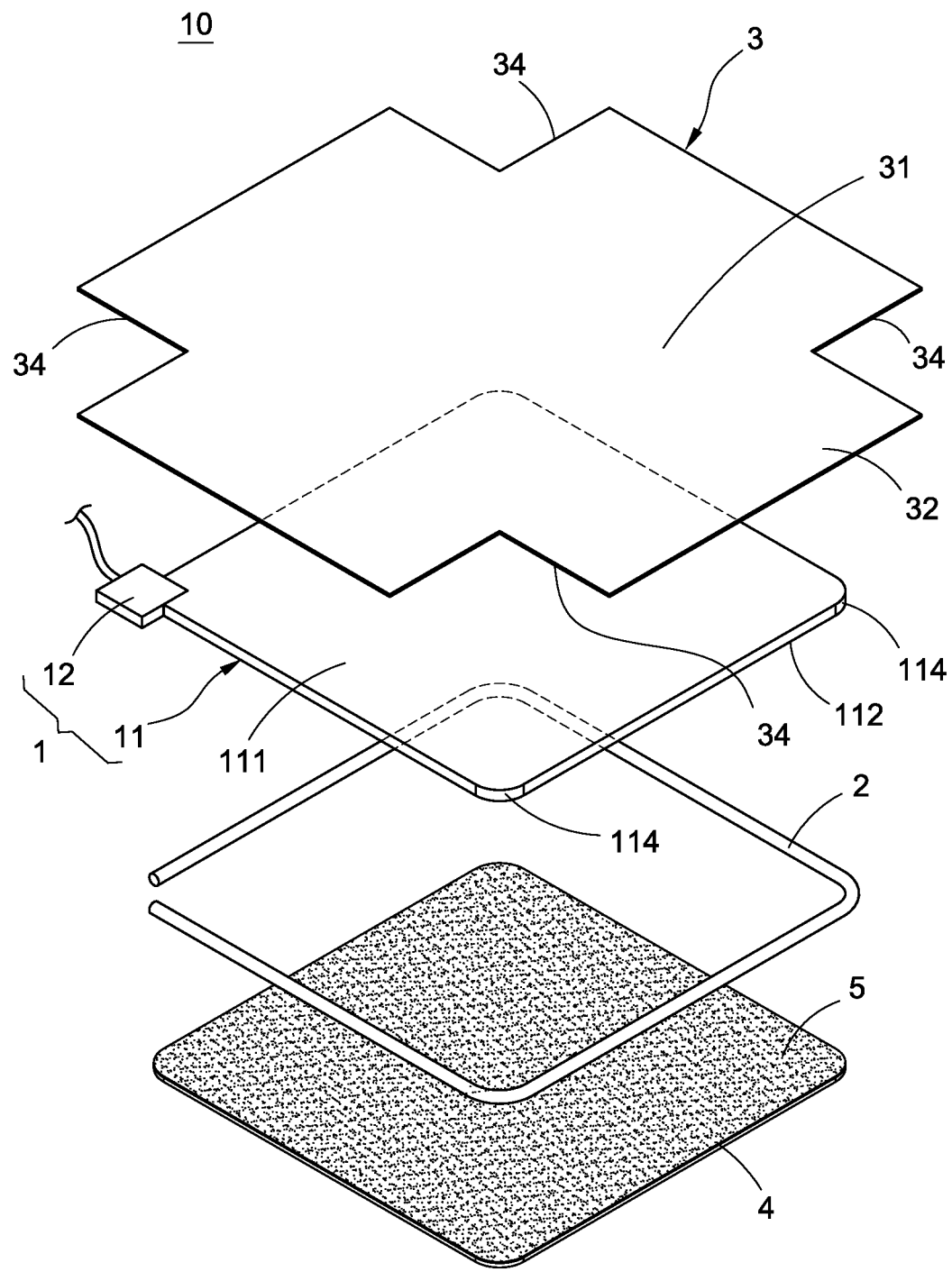
FIG. 2 is a perspective exploded view showing the light-emitting pad structure according to the present invention.
Figure 3:
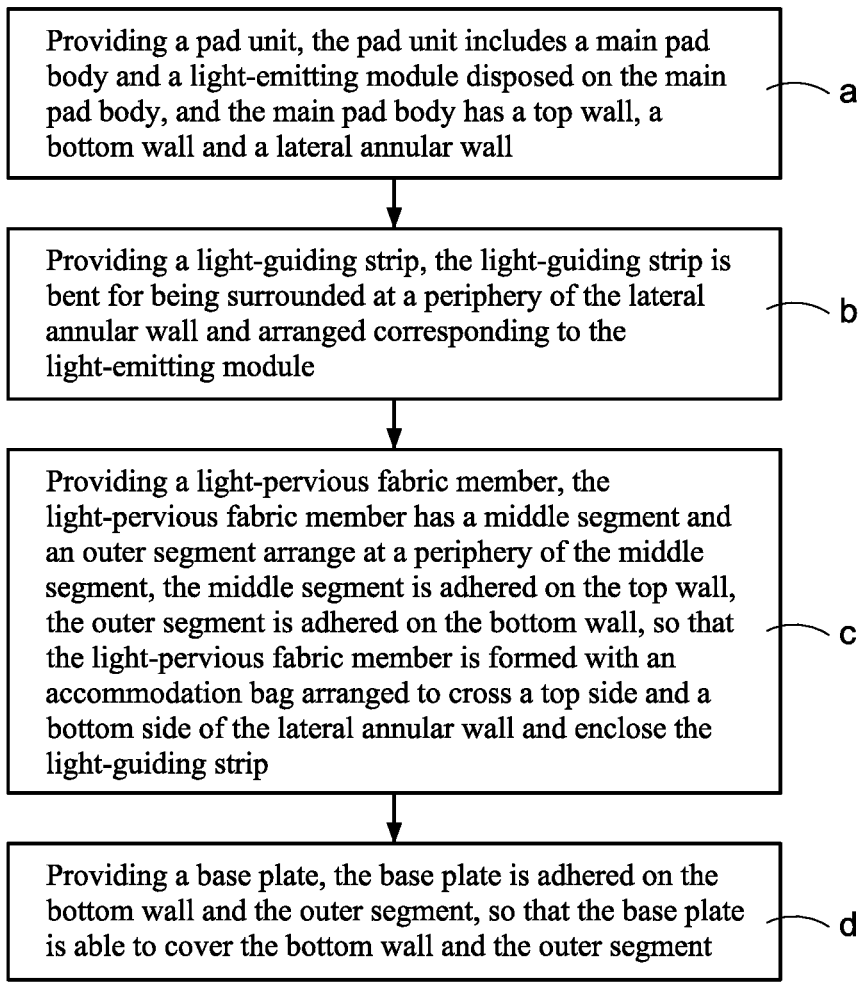
FIG. 3 is a flowchart showing a manufacturing method of the light-emitting pad structure according to the present invention.

As shown in FIG. 3, the manufacturing method of the light-emitting pad structure 10 disclosed in the present invention includes following steps. As shown in FIG. 3 and FIG. 2, A step a) is disclosed. In the step a), the pad unit 1 is provided, the pad unit 1 includes a main pad body 11 and a light-emitting module 12 disposed on the main pad body 11, and the main pad body 11 has a top wall 111, a bottom wall 112 and a lateral annular wall 113.

Wherein, according to this embodiment, the main pad body 11 is formed as a polygonal plate body and has a plurality of corners 114, and the light-emitting module 12 is disposed at one of the corners 114, but what shall be addressed is that the scope of the present invention is not limited to the above-mentioned arrangement, the main pad body 11 can be formed as a plate member having any geometrical shape, for example round, oval, triangular or rectangular shape; the light-emitting module 12 can be disposed at any location, for example the lateral annular wall 113, where the light-guiding strip 2 is enabled to efficiently guide lights.

Figure 4A:
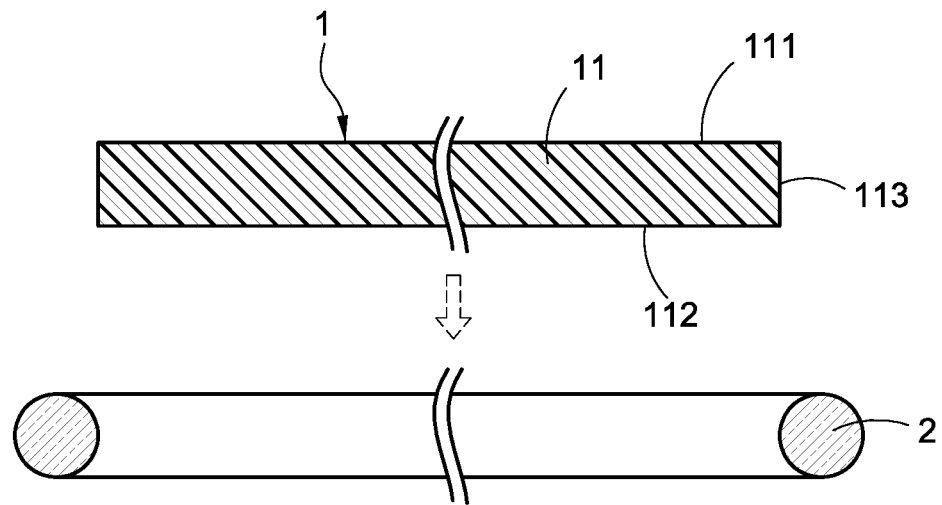
FIG. 4a is a schematic view showing the light-guiding strip being bent for being surrounded at a periphery of the lateral annular wall according to the present invention.
Figure 4B:
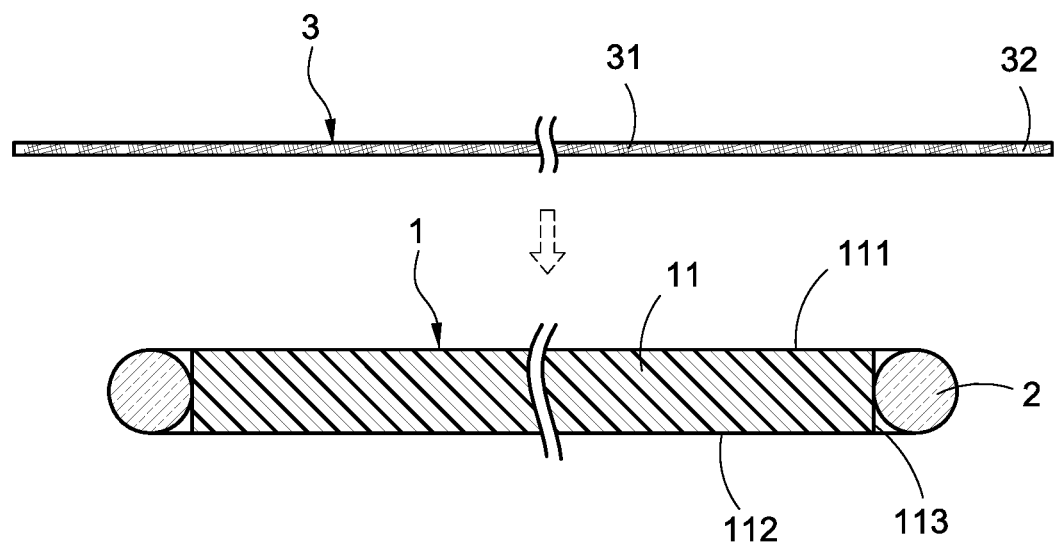
FIG. 4b is a schematic view showing the middle segment being adhered to the top wall according to the present invention.
Figure 4C:
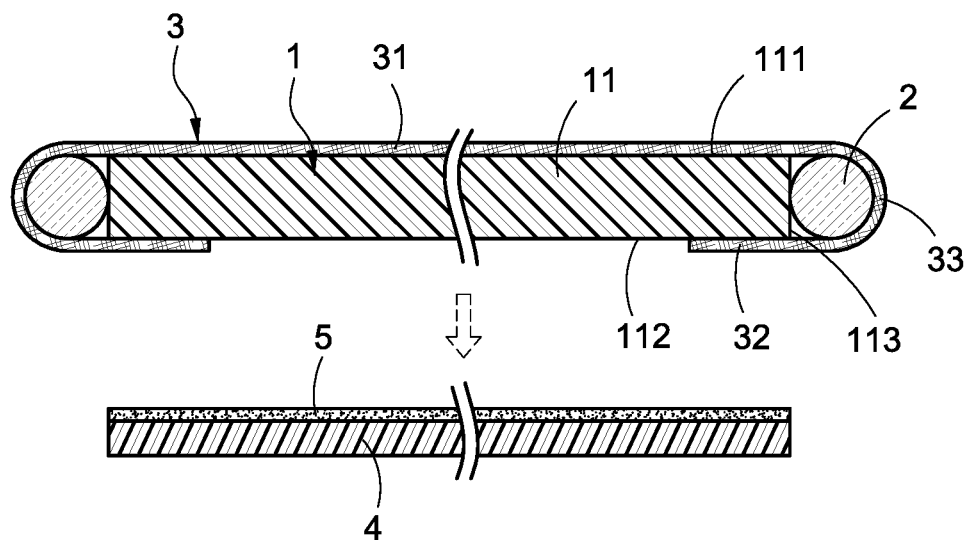
FIG. 4c is a schematic view showing the light-pervious fabric member being formed with the accommodation bag according to the present invention.

Please refer to FIG. 3, FIG. 2 and FIG. 4a, a step b) is disclosed. In the step b), the light-guiding strip 2 is provided, and the light-guiding strip 2 is bent for being surrounded at a periphery of the lateral annular wall 113 and arranged corresponding to the light-emitting module 12. Wherein, lights generated by the light-emitting module 12 are guided via the light-guiding strip 2 so as to enable the lights to be outputted at a periphery of the main pad body 11.

Please refer to FIG. 3, FIG. 1, FIG. 2, FIG. 4b and FIG. 4c, a step c) is disclosed. In the step c), the light-pervious fabric member 3 is provided, the light-pervious fabric member 3 has a middle segment 31 and an outer segment 32 arrange at a periphery of the middle segment 31, the middle segment 31 is adhered to the top wall 111, the outer segment 32 is adhered to the bottom wall 112, so that the light-pervious fabric member 3 is formed with an accommodation bag 33 arranged to cross a top side and a bottom side of the lateral annular wall 113 and enclose the light-guiding strip 2. Wherein, the light-pervious fabric member 3 can be made of a light-pervious material, so that a brightness of the light-guiding strip 2 is allowed to be presented via the light-pervious fabric member 3.

Please refer to FIG. 3, FIG. 1, FIG. 2, FIG. 4c and FIG. 4d, a step d) is disclosed. In the step d), the base plate 4 is provided, and the base plate 4 is adhered to the bottom wall 112 and the outer segment 32, so that the base plate 4 can be served to cover the bottom wall 112 and the outer segment 32.

Details are provided as follows. According to this invention, the light-emitting pad structure 10 further includes an adhesive layer 5; the adhesive layer 5 is disposed between the base plate 4, the bottom wall 112 and the outer segment 32, so that the base plate 4 is able to be adhered to the bottom wall 112 and the outer segment 32, and a finished product of the light-emitting pad structure 10 as shown in FIG. 1 is provided.

Figure 4D:
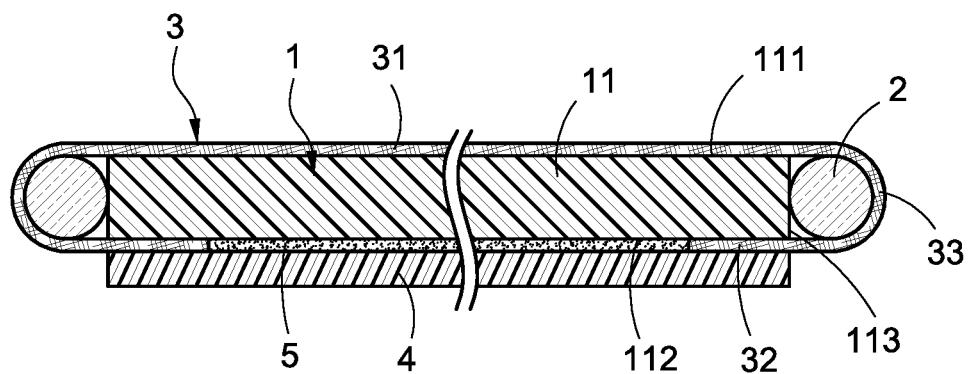
FIG. 4d is a schematic view showing the base plate being adhered to the bottom wall and the outer segment according to the present invention.
Figure 5:
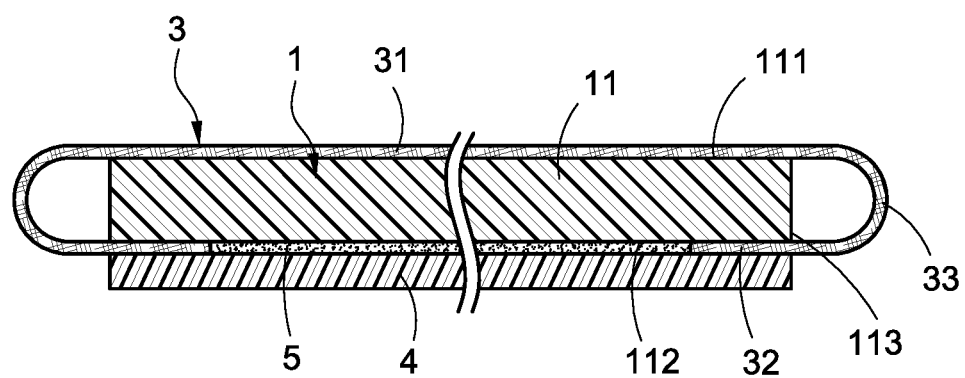
FIG. 5 is a schematic view showing the light-guiding strip being able to be removed from the accommodation bag according to the present invention.

Moreover, the accommodation bag 33 can be formed with one or plural openings 34; as shown in FIG. 4d, the light-guiding strip 2 can be accommodated in the accommodation bag 33 through the opening 34; or as shown in FIG. 5, the light-guiding strip 2 can be removed from the accommodation bag 33 through the opening 34.

According to this embodiment, there are a plurality of the openings 34, each of the openings 34 is inwardly formed from an outer periphery of the outer segment 32, the location of each of the openings 34 is corresponding to the location of each of the corners 114, but what shall be addressed is that the scope of the present invention is not limited to the above-mentioned arrangement, an effect of allowing the light-guiding strip 2 to be accommodated in or removed from the accommodation bag 33 can be achieved as along as the openings 34 are formed on the accommodation bag 33, and the openings 34 can also be formed on uncovered portions defined by the middle segment 31 and the outer segment 32.

As shown in FIG. 1 and FIG. 2, an operating status of the light-emitting pad structure 10 is illustrated as follows. The light-pervious fabric member 3 is formed with the accommodation bag 33 crossing the top side and the bottom side of the lateral annular wall 113 of the main pad body 11 and having two sides thereof fastened on the top wall 111 and the bottom wall 112, so that when the light-guiding strip 2 is accommodated in the accommodation bag 33, the brightness of the light-guiding strip 2 can be presented via the accommodation bag 33 (because the light-pervious fabric member 3 is made of a light-pervious material), thereby enhancing a halo-like visual effect at the periphery of the lateral annular wall 113, and meanwhile the light-guiding strip 2 can be positioned at the periphery of the lateral annular wall 113 via the accommodation bag 33, thus a conventional method of general or overlock sewing at an outer periphery of a pad unit can be replaced, and situations of sewing thread being broken, uneven tightness of sewing thread or the sewing thread being inclined can be avoided, thereby increasing the yield rate of manufacturing the light-emitting pad structure 10.

Moreover, there are one or a plurality of the openings 34 formed on the accommodation bag 33 for allowing the light-guiding strip 2 to be accommodated in or removed from the accommodation bag 33 through the opening 34, so that a user can replace the light-guiding strip 2 according to the quality of the light-guiding strip 2 or his/her personal tastes. Accordingly, the light-emitting pad structure and the manufacturing method thereof provided by the present invention are novel and more practical in use comparing to prior art.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A light-emitting pad structure, including:
   a pad unit, including a main pad body and a light-emitting module disposed on the main pad body, wherein the main pad body has a top wall, a bottom wall and a lateral annular wall;
   a light-guiding strip, bent for surrounding a periphery of the lateral annular wall and arranged corresponding to the light-emitting module;
   a light-pervious fabric member, having a middle segment and an outer segment arrange at a periphery of the middle segment, wherein the middle segment is adhered to the top wall, the outer segment is adhered to the bottom wall, so that the light-pervious fabric member is formed with an accommodation bag arranged to cross a top side and a bottom side of the lateral annular wall and enclose the light-guiding strip; and a base plate, adhered to and covering the bottom wall and the outer segment.

2. The light-emitting pad structure according to claim 1, wherein at least one opening is formed on the accommodation bag for allowing the light-guiding strip to be accommodated in or removed from the accommodation bag through the at least one opening.

3. The light-emitting pad structure according to claim 2, wherein the at least one opening is inwardly formed from an outer periphery of the outer segment.

4. The light-emitting pad structure according to claim 2, wherein there are a plurality of the openings, the main pad body is formed as a polygonal plate body and has a plurality of corners, and a location of each of the openings is arranged to be corresponding a location of each of the corners.

5. The light-emitting pad structure according to claim 1, further including an adhesive layer, the adhesive layer is disposed between the base plate, the bottom wall and the outer segment.

6. A method of manufacturing a light-emitting pad structure, including:
   a step a) providing a pad unit, wherein the pad unit includes a main pad body and a light-emitting module disposed on the main pad body, and the main pad body has a top wall, a bottom wall and a lateral annular wall;
   a step b) providing a light-guiding strip, wherein the light-guiding strip is bent for surrounding a periphery of the lateral annular wall and arranged corresponding to the light-emitting module;
   a step c) providing a light-pervious fabric member, wherein the light-pervious fabric member has a middle segment and an outer segment arrange at a periphery of the middle segment, the middle segment is adhered to the top wall, the outer segment is adhered to the bottom wall, so that the light-pervious fabric member is formed with an accommodation bag arranged to cross a top side and a bottom side of the lateral annular wall and enclose the light-guiding strip; and
   a step d) providing a base plate, wherein the base plate is adhered to the bottom wall and the outer segment, so that the base plate is able to cover the bottom wall and the outer segment.

7. The method according to claim 6, wherein in the step c), at least one opening is formed on the accommodation bag for allowing the light-guiding strip to be accommodated in or removed from the accommodation bag through the at least one opening.

8. The method according to claim 7, wherein the at least one opening is inwardly formed from an outer periphery of the outer segment.

9. The method according to claim 7, wherein there are a plurality of the openings, the main pad body is formed as a polygonal plate body and has a plurality of corners, and a location of each of the openings is arranged to be corresponding a location of each of the corners.

10. The method according to claim 6, wherein in the step d), an adhesive layer is further provided, and the adhesive layer is disposed between the base plate, the bottom wall and the outer segment.

* * * * *